US012717665B2

(12) United States Patent
Arunachalam

(10) Patent No.: US 12,717,665 B2
(45) Date of Patent: Aug. 25, 2026

(54) PRIORITIZED MESSAGE ACCESS LISTS FOR INTER-PROCESS COMMUNICATION

(71) Applicant: Hewlett Packard Enterprise Development LP, Spring, TX (US)

(72) Inventor: Somasundaram Arunachalam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 456 days.

(21) Appl. No.: 18/362,696

(22) Filed: Jul. 31, 2023

(65) Prior Publication Data

US 2025/0045132 A1 Feb. 6, 2025

(51) Int. Cl.
*G06F 9/54* (2006.01)

(52) U.S. Cl.
CPC .................................... *G06F 9/546* (2013.01)

(58) Field of Classification Search
CPC ....... G06F 9/54; H04L 49/103; H04L 49/105; H04L 67/568
See application file for complete search history.

(56) References Cited

U.S. PATENT DOCUMENTS 5,878,258 A * 3/1999 Pizi ......................... G06F 9/451 719/320
7,877,413 B1 * 1/2011 Cook ...................... G06F 9/545 717/170
7,937,364 B1 * 5/2011 Chandrasekaran ..... G06F 9/546 707/636
12,504,879 B2 * 12/2025 Pabón ................... G06F 3/0607
2002/0165981 A1 * 11/2002 Basturk ................... G06F 9/542 719/318
2013/0246714 A1 * 9/2013 Lv ........................... G06F 16/21 711/147
2019/0312947 A1 * 10/2019 Brown ................ G06F 11/0709
2020/0301765 A1 * 9/2020 Vary ......................... G06F 9/52
2022/0155992 A1 * 5/2022 Nortman ................. G06F 9/544
2023/0054696 A1 * 2/2023 Kappes ................. G06F 9/5011

OTHER PUBLICATIONS

The DBOS DBOS:"A Proposal fora Data-Centric Operating System Committee," Jul. 21, 2020, 20 pages.

(Continued)

*Primary Examiner* — Lewis A Bullock, Jr.
*Assistant Examiner* — Carlos Alberto Espana
(74) *Attorney, Agent, or Firm* — Slater Matsil, LLP

(57) ABSTRACT

In certain embodiments, a method includes providing, by an inter-process communication (IPC) manager, an initial prioritized message access list information set; receiving a second request for at least one prioritized message access list; and providing a prioritized message access list within a shared memory pool. The prioritized message access list may include a prioritized message access list identifier, an intra-list priority range, and a prioritized message access list size. The method may also include parsing, by the IPC manager, a message posted to the prioritized message access list to determine a time at which to alert a receiving process about the message; notifying the receiving process at the determined time; and decrementing, in response to the receiving process consuming the message, a message reference count.

20 Claims, 5 Drawing Sheets

(56) References Cited

OTHER PUBLICATIONS

"Creative Commons—Attribution 3.0 Unported—CC By 3", available online at https://web.archive.org/web/20200303233918/https://creativecommons.org/licenses/by/3.0/>, Mar. 3, 2020, 2 pages.
"Trends in Information Technology", available online at <https://courses.lumenlearning.com/suny-osintrobus/chapter/ trends-in-information-technology/>, Dec. 4, 2021, 16 pages.
Iwami et al., "Utility-based Distributed Association Control Scheme with User Guidance for IEEE802.11 Wireless LANs", IEICE Transactions on Communications, vol. E98-B, Issue 8, Aug. 2015, pp. 1700-1714.
Andreas Wicenec, "Scheduling, deploying and monitoring 100 million tasks", ICRAR, Nov. 4, 2019, 24 Pages.

* cited by examiner

PRIORITIZED MESSAGE ACCESS LISTS FOR INTER-PROCESS COMMUNICATION

BACKGROUND

Computer applications may execute to obtain results based on the execution of various operations performed by processes. In some instances, such applications may execute, at least in part, on different processors, different computing devices, etc. (e.g., as distributed applications). In order to execute, such applications may access data from one or more memory devices. In some scenarios, any number of computing devices, processors, etc. may be configured to access a shared set of memory devices, which may facilitate, at least in part, the sharing of data between processes executing on different computing devices, different processors, etc. However, techniques for sharing data between processes in such scenarios may lack features to allow for efficient, scalable, and prioritized data sharing.

BRIEF DESCRIPTION OF THE DRAWINGS

Certain embodiments discussed herein will be described with reference to the accompanying drawings listed below. However, the accompanying drawings illustrate only certain aspects or implementations of embodiments described herein by way of example, and are not meant to limit the scope of the claims.

DETAILED DESCRIPTION

Figure 1:
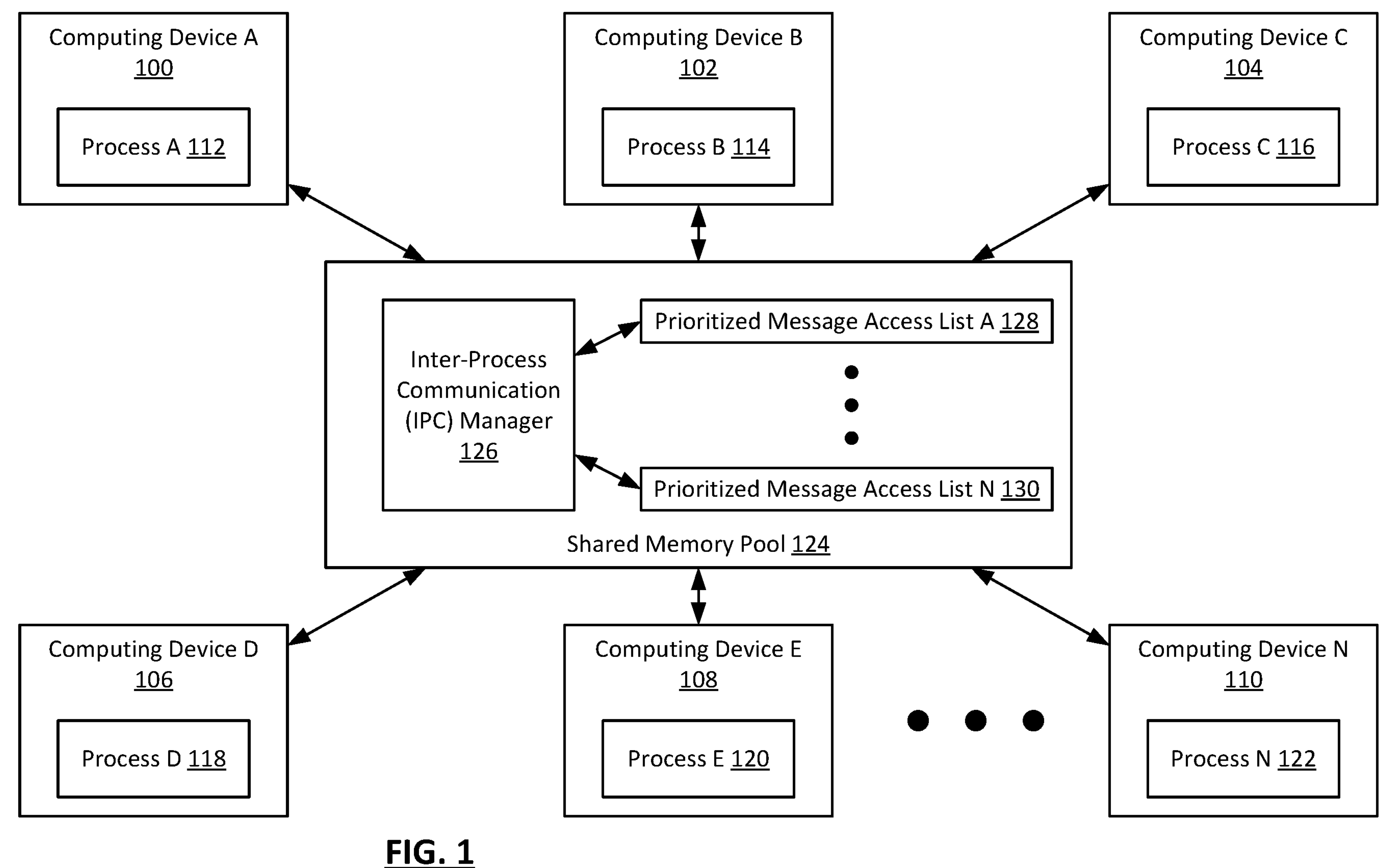
FIG. 1 illustrates a block diagram of an example system for implementing inter-process communication, in accordance with or more embodiments of this disclosure.

Certain embodiments will now be described with reference to the accompanying figures.

In general, embodiments described herein relate to methods, systems, and non-transitory computer readable media storing instructions for implementing inter-process communication between processes executing on different computing devices and/or processors by using prioritized message access lists in a shared memory pool in accordance with one or more embodiments of this disclosure.

As computing technology advances, the number of processes (e.g., tasks, threads, etc.) being executed for an application is increasing, and such processes may be executed on computing devices in different locations, on different processors in the same location, etc. To successfully execute as intended, processes may communicate with one another. As an example, data (e.g., some intermediate result of a computation) generated at a first process (e.g., executing on a first computing device or processor) may be shared with a second process (e.g., executing on a second computing device or processor) for further processing. However, some methods of inter-process communication (e.g., inter-process message passing, simple message queues, etc.) do not exhibit adequate scalability in ecosystems of computing devices in which many (e.g., millions) of processes work together to achieve a goal. Examples of scenarios that may use processes/threads at such a scale may include, but are not limited to, high performance computing, complex modeling/simulation involving research and experiments in various areas (e.g., biological gene modeling, real-world simulations, sampling/modeling/simulation using astronomical data, etc.), autonomous vehicle control, financial modeling, predictive analysis, machine learning/artificial intelligence implementations, etc., and such scenarios are becoming increasingly common. In such scenarios, the architecture of applications may be sophisticated and distributed, with execution occurring using memory driven computing ecosystems.

Additionally, some methods of inter-process communication may lack the ability to provide prioritization of messages, as they are often implemented using simple schemes such as first-in first-out or last-in first out buffers or queues. Prioritization of and organization of heterogenous custom configurable messages may be important, for example, when certain processes and results (e.g., for scientific and research software and/or applications) are more critical or important to execute or complete than other processes or results, or when a subsequent process requires a previous result to continue execution. As an example, for an autonomous vehicle, processes related to speed control, braking control, and navigation control when the autonomous vehicle encounters an unexpected obstruction may be more critical than processes related to in-vehicle ambiance control (e.g., air conditioning/heating, lighting, entertainment systems, etc.). In such an example, messages from an autonomous vehicle orchestration manager process to the more critical subsystems should be consumed by various relevant subsystem processes before less critical messages from the orchestration manager to various relevant sub-system processes.

Lastly, messages for inter-process communication often lack details that identify the transmitting process and/or one or more intended receiving processes, which may limit the flexibility of an inter-process communication scheme. For example, some message schemes may be incapable of facilitating a one-to-many distribution of data where the one transmitting process distributes the same information/data to any number of intended recipient processes (e.g., a certain select number of intended recipient processes), and that the message for the intended recipient processes is purged after being consumed by the intended recipient processes.

To potentially address one or more of the above-described problems with inter-process communication schemes, certain embodiments of this disclosure include using prioritized message access lists for inter-process messages with both the lists themselves, and the messages within a given list, being prioritizable, thereby providing relatively fine-grained inter-process message priority at two levels. Additionally, the messages in the aforementioned message access lists include a variety of details that may be used to improve the efficiency of inter-process communication. Such messages may be, for example, with intra-compute inter-process messages and/or inter-compute inter-process messages. Such details may include, but are not limited to, an identification of the task transmitting the message, an identification of any number of intended recipients of the message, a value representing the number of intended recipients of the message, etc.

When many processes (such as, for example, in scenarios discussed above) are designed to work together and communicate with one another, the various computing devices and/or processors executing the processes may be configured to access and use a shared memory pool to communicate. In one or more embodiments, a shared memory pool is a collection of computer storage devices of any type (e.g., volatile memory devices, non-volatile memory devices, any combination of volatile and non-volatile memory devices, etc.) that is commonly accessible by any number of computing devices and/or processors implementing any number of applications. As an example, a shared memory pool may be implemented as a fabric of memory devices that various processes may access and use to execute (e.g., by obtaining instructions from the memory), store results, obtain data, etc. In one or more embodiments, a shared memory pool may be heterogeneous, distributed, and connected. As used herein, the term shared memory pool may refer to any set of memory devices in any architecture in any number of one or more locations that is configured to be accessible to any number of computing devices and/or processors. Additionally, the term shared memory pool may refer to an entire shared memory pool, or to any portion thereof, such as, for example, an IPC memory lake within a larger shared memory pool. In one or more embodiments, an ecosystem that includes a shared memory pool and any number of computing devices, processors, etc. may be referred to as a memory driven computing ecosystem. In a memory driven computing ecosystem, memory is at the center of the compute ecosystem and processors at the periphery. Such processors may be part of high performance computing clusters, supercomputers, etc., where, for example, distributed scientific applications may be executed. One having ordinary skill in the art, and the benefit of this Detailed Description, will appreciate that the aforementioned example of a high performance computing cluster is not intended to limit the scope of embodiments described herein. As an example, embodiments discussed herein may also include embedded compute ecosystems with miniaturized memory driven fabric in an edge server along with edge devices, inside an autonomous vehicle, etc.

A shared memory pool may include and/or be operatively connected to an instance of a distributed inter-intra compute inter-process communication (IPC) manager, which may be referred to in this Detailed Description as an IPC manager, for the sake of clarity. In one or more embodiments, an "inter-intra compute" IPC manager may refer to the fact that an IPC manager may be for inter-compute scenarios, intra-compute scenarios, or a combination thereof. In one or more embodiments, the IPC manager may be an entity that manages the shared memory pool, or any portion thereof (e.g., one or more IPC memory lakes, which may be referred to herein as a shared memory pool for the sake of clarity), by, for example, provisioning the memory of the shared memory pool (or, again, any portion thereof) to be available to one or more processes executing on any number of processors or computing devices, and creating and managing prioritized message access lists for such processes, including inter and intra list priorities. As an example, an IPC manager may request from a memory manager for a shared memory pool a particular amount of memory to serve as an IPC shared memory pool (e.g., an IPC memory lake) for facilitating inter-process communications.

The IPC shared memory pool, which may be all or any portion of an overall shared memory pool (e.g., an IPC memory lake within a larger shared memory pool), may then be used for inter-process communication via prioritized message access lists. In one or more embodiments, a prioritized message access list can be a portion of the shared memory pool configured to allow one or more transmitting processes to communicate messages to one or more receiving processes. An IPC manager may pre-configure any number of prioritized message access lists. Additionally, or alternatively, the IPC manager may be configured to interact with processes to create prioritized message access lists within a shared memory pool upon request by any process for any reason. As used herein, the term prioritized message access list may include, but is not limited to, message access lists that are heterogeneous in terms of payload, size, etc.

As an example, a process (e.g., a transmitting process) may request from the IPC manager certain details about prioritized message access list availability and/or attributes or characteristics of lists that can be created. When prioritized message access lists have been pre-configured by the IPC manager, a process may request information related to the number of lists available, a set of priority list identifiers for the available prioritized message access lists, the size(s) of such lists (e.g., the quantity of messages a list may include), information related to intra-list prioritization (e.g., pre-configured priority ranges for each of the pre-configured priority lists), etc. When prioritized message access lists are to be created upon request (e.g., not pre-configured), a process may request information from the IPC manager related to attributes and characteristics of lists it is allowed to create, such as the number of prioritized message access lists that may be created, the minimum and/or maximum size of lists that may be created, information related to intra-list priorities (e.g., minimum and/or maximum sizes of intra-list priority ranges), etc. In either case, the IPC manager responds to the query from the process by providing the requested information.

Once a process has received such information from the IPC manager, the process may request any number of prioritized message access lists to be reserved or created by the IPC manager for the process. To facilitate the request, the IPC manager may communicate to the requesting process a set of one or more priority list identifiers for each of the reserved or created lists, the size of the lists (e.g., the number of messages that may be stored in each of the lists), and intra-list priority information for each of the lists (e.g., for a given prioritized list messages may be assigned any priority within a range of 0 to 100). As an example, intra-list priority information may include, but is not limited to, a set values represented or annotated in any way, such as any one or more alphanumeric characters, representing a range of priorities as unique priority identifiers, and may include, for example, positive numbers, negative numbers, zero, or any other unique identification of a set of items in a list, all or any portion of which may be customizable in any relevant way.

In one or more embodiments, once a set of one or more prioritized message access lists have been created for a process, a transmitting process may begin using the list(s) to transmit inter-process communication messages to one or more receiving processes. During this time, the process that requested the one or more prioritized message access lists may communicate the prioritized message access list identifiers, and other related information, to other processes (e.g., receiving processes) that will be using the prioritized message access lists. In one or more embodiments, processes that are to be receiving processes using the prioritized message access lists may communicate with the IPC manager to set up how the receiving processes will be made aware that a message has been received for the receiving processes.

As an example, a receiving process may request that the IPC manager set up a signal handler to be invoked any time a message for the receiving process is posted to a certain prioritized message access list and/or has a certain intra-list priority within a priority message access list. In such an example, the IPC manager will parse messages posted by a transmitting process, and when a message having the characteristics associated with the signal handler is identified, the IPC manager will alert the receiving process (e.g., via an interrupt) that the message is available for consumption. As another example, a receiving process may communicate with the IPC manager that the receiving process would like the IPC manager to periodically poll messages within one or more prioritized message access lists to determine if any messages have been received for the receiving process. In such an example, at the defined polling time, the IPC manager will determine all one or more messages received for the receiving process in the prioritized message access list since the last polling period, and communicate to the receiving process the messages that are available for the receiving process to consume. One of ordinary skill in the art will appreciate that any other methods of making a receiving process aware of an available message may be used without departing from the scope of embodiments described herein.

In one or more embodiments, during runtime (e.g., while an application is executing), a transmitting process may generate any number of messages to be communicated to any number of receiving processes. As used herein, the term any number may be considered to include any number, even very large numbers. For a given message, the message may include, but is not limited to: a prioritized message access list identifier, a transmitting process identifier, one or more receiving process identifiers, a message reference count, an intra-list priority for the message, and a message payload. In one or more embodiments, the prioritized message access list identifier identifies the prioritized message access list into which the message is posted. In one or more embodiments, the transmitting process identifier identifies the process that is transmitting the message. In one or more embodiments, the one or more receiving process identifiers identify the one or more receiving processes for which the message is intended. In one or more embodiments, the message reference count is a value representing the number of receiving processes identified by the receiving process identifiers. In one or more embodiments, the intra-list priority for the message is a value within the intra-list priority range of the prioritized message access list that represents the priority of the message relative to priorities of other messages that may be in the prioritized message access list, and may determine, at least in part, the order in which a receiving process consumes messages from a prioritized message access list. In one or more embodiments, the message payload includes any data that the transmitting process is seeking to provide to the one or more receiving processes, and may be any size or amount of data of any type.

In one or more embodiments, once the message is added to the prioritized message access list, the IPC manager may parse the message to determine if the message corresponds to a signal handler for any one or more receiving processes. For example, the IPC manager may determine whether the message is intended for a certain receiver, is in a certain prioritized message access list, and includes a certain intra-list priority, and, if so, invoke the corresponding signal handler to immediately alert the one or more receiving processes that the message is available. As another example, the IPC manager may periodically parse messages that were not associated with a signal handler for immediate notification to the receiving process, with various periods being determined by the polling period set up for various receiving processes. In one or more embodiments, for a given receiving processing and a given polling period, the IPC manager may parse such messages to determine a set of messages intended for the receiving process, and alert the receiving process of the existence of all such messages found, which may include, for example, all messages posted for the receiving process since the last polling period.

In either case, once the IPC manager alerts a receiving process that a message is available for consumption, the receiving process may consume the message, including the content of the message payload. The IPC manager may become aware that a receiving process has consumed a message using any suitable technique (e.g., being informed by the receiving process, monitoring accesses to the memory location of the message, etc.). In one or more embodiments, after a receiving process consumes a message, the IPC manager may decrement the message reference count associated with the message. In one or more embodiments, once the message reference count reaches zero, meaning that the message has been consumed by all intended receiving processes, the IPC manager may delete the message.

Certain embodiments may improve inter-process communications between processes using shared memory pools by facilitating inter-process communication using prioritized message access lists, where the lists themselves may have relative priorities, and the messages within a given list may separately have relative priorities. Using prioritized message access lists, a transmitting process may communicate a message to any number of receiving processes. Based at least in part on the priorities of the message (e.g., the list in which the message is posted and the intra-list priority) and the intended receiving process(es), an IPC manager may determine when to alert the receiving process(es) that the messages are available, and delete the messages after consumption by all intended receiving processes.

FIG. 1 illustrates a block diagram of an example system for implementing inter-process communication in accordance with or more embodiments of this disclosure. The system may include any number of computing devices, such as computing device A 100, computing device A 100, computing device B 102, computing device C 104, computing device D 106, computing device E 108, and computing device N 110. Such computing devices may each execute any number of processes, such as process A 112, process B 114, process C 116, process D 118, process E 120, and process N 122, which may execute on respective computing devices. The computing devices may be operatively connected to a shared memory pool 124. The shared memory pool may include and/or be operatively connected to an IPC manager 126, and may include any number of prioritized message access lists (e.g., prioritized message access list A 128, prioritized message access list B 130). Each of these components is described below.

In one or more embodiments, as used herein, a computing device (e.g., 100, 102, 104, 106, 108, 110) may be any single computing device, a set of computing devices, a portion of one or more computing devices, or any other physical, virtual, and/or logical grouping of computing resources. In one or more embodiments, a computing device is any device, portion of a device, or any set of devices capable of electronically processing instructions and may include, but is not limited to, any of the following: one or more processors (e.g. components that include circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (ISCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), an Internet of Things (IoT) device, an array of nodes of computing resources, a supercomputing device, a data center or any portion thereof, and/or any other type of computing device with the aforementioned requirements. In one or more embodiments, any or all of the aforementioned examples may be combined to create a system of such devices, or may be partitioned into separate logical devices, which may collectively be referred to as a computing device. Other types of computing devices may be used without departing from the scope of embodiments described herein, such as, for example, the computing device shown in FIG. 5 and described below.

In one or more embodiments, the storage (not shown) and/or memory (not shown) of a computing device or system of computing devices may be and/or include one or more data repositories for storing any number of data structures storing any amount of data (e.g., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) and/or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods, processes, etc. of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Although FIG. 1 shows six computing devices, one having ordinary skill in the relevant art, and the benefit of this Detailed Description will appreciate that the system may include any number of computing devices, which the three dots between the computing device E 108 and the computing device N 110 is intended to convey. All or any portion of the computing devices may be the same type, or different types of computing devices.

In one or more embodiments, a computing device (e.g., 100, 102, 104, 106, 108, 110) may be configured to execute any number of processes (e.g., 112, 114, 116, 118, 120, 122). As used herein, a process is any set of operations performed via execution of instructions by a processor of a computing device. A process may execute one or more threads, tasks, etc., generally to achieve a defined result. A process may be all or part of an application. An application may be software designed to perform any function. Examples of applications include, but are not limited to, high performance computing applications, biological gene modeling applications, real-world simulations, sampling of astronomical data, autonomous vehicle control, financial modeling, predictive analysis, machine learning/artificial intelligence applications, etc. A process (e.g., 112, 114, 116, 118, 120, 122) may be part of a distributed application. In one or more embodiments, a distributed application is an application in which processes may execute on separate computing devices and/or separate processors. As an example, a distributed application may include processes executing on separate computing devices in different physical locations (e.g., in separate data centers). As another example, a distributed application may execute processes on separate processors, which may be part of the same computing device and/or separate computing devices. In one or more embodiments, a process (e.g., 112, 114, 116, 118, 120, 122) executes to generate or otherwise obtain a result. In some cases, the result obtained by a process may be an intermediate result. In one or more embodiments, an intermediate result is any result obtained by a process that is to be used by another process. As an example, a process of a distributed application executing on one computing device may execute to obtain an intermediate result, and the intermediate result may be provided to another process of the distributed application executing on another computing device to be used for further execution of the application.

In one or more embodiments, the system may include a shared memory pool 124. In one or more embodiments, a shared memory pool is a collection of computer storage devices of any type (e.g., volatile memory devices, non-volatile memory devices, any combination of volatile and non-volatile memory devices, etc.) that is commonly accessible by any number of computing devices and/or processors implementing any number of applications via execution of any number of processes. As an example, a shared memory pool may be implemented as a fabric of memory devices that various processes may access and use to execute (e.g., by obtaining instructions from the memory), store results, obtain data, etc. The shared memory pool 124 may be a collection of any number of memory or other storage devices, and may or may not be located at the same physical site. As an example, a rack of devices, each including any amount of memory, may be interconnected by a fabric of connections to implement a shared memory pool 124. As another example, any number of devices having any amount of memory may be interconnected (e.g., via a network) to form the shared memory pool 124. Other configurations of collections of devices for storing data may be used to implement the shared memory pool 124 without departing from the scope of embodiments described herein. The shared memory pool 124 may be all of a shared memory pool, or may be a portion of a larger shared memory pool, with the larger shared memory pool being configured to interact with any number of computing devices and the shared memory pool 124 being configured to interact with a certain set of computing devices (e.g., 100, 102, 104, 106, 108, 110).

In one or more embodiments, the various computing devices (e.g., 100, 102, 104, 106, 108, 110) may be operatively connected to the shared memory pool 124, and/or various portions of the shared memory pool may be interconnected, using any suitable form of connection that allows information to be exchanged. As an example, one or more of the aforementioned components of the system may be connected to any other of the components via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap with, at least in part, the Internet.

In one or more embodiments, the shared memory pool 124 includes memory that may be accessed by any of the computing devices (e.g., 100, 102, 104, 106, 108, 110) using any scheme for addressing memory (e.g., by use of memory addresses associated with various portions of the memory devices of the shared memory pool 124). All or any portion of the computing devices may be configured to work in conjunction with one another, for example, to execute an application by executing processes.

In one or more embodiments, the shared memory pool 124 facilitates, at least in part, such configurations by providing memory locations accessible to separate processors and/or computing devices, in which information may be stored. As an example, a result obtained by a process executing on one computing device and/or processor may be stored in the shared memory pool 124 so that a process executing on another processor and/or computing device may access or otherwise obtain the result.

In one or more embodiments, the shared memory pool includes and/or is operatively connected to the IPC manager 126. In one or more embodiments, the IPC manager 126 is any hardware (e.g., circuitry), software, firmware, or any combination thereof configured to manage various aspects of the shared memory pool 124. In one or more embodiments, the IPC manager 126 is an entity that manages the shared memory pool 124, or any portion thereof, by, for example, provisioning the memory of the shared memory pool 124 to be available to one or more processes executing on any number of processors and/or computing devices, and by creating and managing prioritized message access lists for such processes, including inter and intra list priorities. As an example, an IPC manager 126 may request from a memory manager (not shown) for a shared memory pool a particular amount of memory to serve as an IPC shared memory pool for facilitating inter-process communications.

The IPC manager 126 may be configured to facilitate inter-process communication between processes using the shared memory pool by providing any number of prioritized message access lists (e.g., 128, 130) to be used by processes. Certain processes may at times be transmitting processes, which seek to provide data (e.g., results) to other processes, which may be referred to as receiving processes. In one or more embodiments, a prioritized message access list is a data construct that includes any portion of the shared memory pool 124. A prioritized message access list (e.g., 128, 130) may include any amount of memory. A prioritized message access list may be pre-configured by the IPC manager 126, or configured by the IPC manager 126 upon request by a process (e.g., a transmitting or receiving process). As an example, a process (e.g., a transmitting process) may request from the IPC manager 126 certain details about prioritized message access list availability and/or attributes or characteristics of lists that can be created. When prioritized message access lists have been pre-configured by the IPC manager 126, a process (e.g., 112, 114, 116, 118, 120, 122) may request information related to the number of lists available, a set of priority list identifiers for the available prioritized message access lists, the size(s) of such lists (e.g., the quantity of messages a list may include), information related to intra-list prioritization (e.g., pre-configured priority ranges for each of the pre-configured priority lists), etc. When prioritized message access lists are to be created upon request (e.g., not pre-configured), a process may request information from the IPC manager related to attributes and characteristics of lists it is allowed to create, such as the number of prioritized message access lists that may be created, the minimum and/or maximum size of lists that may be created, information related to intra-list priorities (e.g., minimum and/or maximum sizes of intra-list priority ranges), etc. In either case, the IPC manager responds to the query from the process by providing the requested information. Once a process has received such information from the IPC manager, the process may request any number of prioritized message access lists to be reserved or created by the IPC manager for the process. To facilitate the request, the IPC manager may communicate to the requesting process a set of one or more priority list identifiers for each of the reserved or created lists, the size of the lists (e.g., the number of messages that may be stored in each of the lists), and intra-list priority information for each of the lists (e.g., for a given prioritized list messages may be assigned any priority within a range of 0 to 100).

A prioritized message access list (e.g., 128, 130) may be any size. A size of a prioritized message access list may refer to a number of messages that may be stored in the prioritized message access list, rather than the amount of memory or storage to be used by the prioritized message access list. As an example, a particular prioritized message access list may be configured to store a particular number of messages, but messages stored in the prioritized message access list may vary in size (e.g., due to different sizes of data payloads associated with the messages). Although the above contemplates an initial set up of prioritized message access lists, prioritized message access lists may be dynamically configurable in real-time, and thus may change in size over time.

In one or more embodiments, a prioritized message access list (e.g., 128, 130) may be configured to store a configured number of messages that a transmitting process seeks to communicate to any number of receiving processes. A message (not shown) may include, but is not limited to: a prioritized message access list identifier, a transmitting process identifier, one or more receiving process identifiers, a message reference count, an intra-list priority for the message, and a message payload. In one or more embodiments, the prioritized message access list identifier identifies the prioritized message access list into which the message is posted. In one or more embodiments, the transmitting process identifier identifies the process that is transmitting the message. In one or more embodiments, the one or more receiving process identifiers identify the one or more receiving processes for which the message is intended. In one or more embodiments, the message reference count is a value representing the number of receiving processes identified by the receiving process identifiers. In one or more embodiments, the intra-list priority for the message is a value within the intra-list priority range of the prioritized message access list that represents the priority of the message relative to priorities of other messages that may be in a prioritized message access list (e.g., 128, 130). In one or more embodiments, the message payload includes any data that the transmitting process is seeking to provide to the one or more receiving processes, and may be any size or amount of data of any type (e.g., a result of one or more computations). Techniques for configuring prioritized message access lists, and for using the prioritized message access lists to provide information from a transmitting process to one or more receiving processes is discussed further in the descriptions of FIGS. 2-4, below.

While FIG. 1 shows a particular configuration of components, other configurations may be used without departing from the scope of embodiments described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by the components shown in FIG. 1. As another example, the system may include any number of computing devices, and each computing device may include any number of processors and/or execute any number of processes. As another example, portions of the computing devices of the system may be configured to communicate with one another, but not with all other computing devices connected to the shared memory pool. Accordingly, embodiments disclosed herein should not be limited to the configuration of components shown in FIG. 1.

Figure 2:
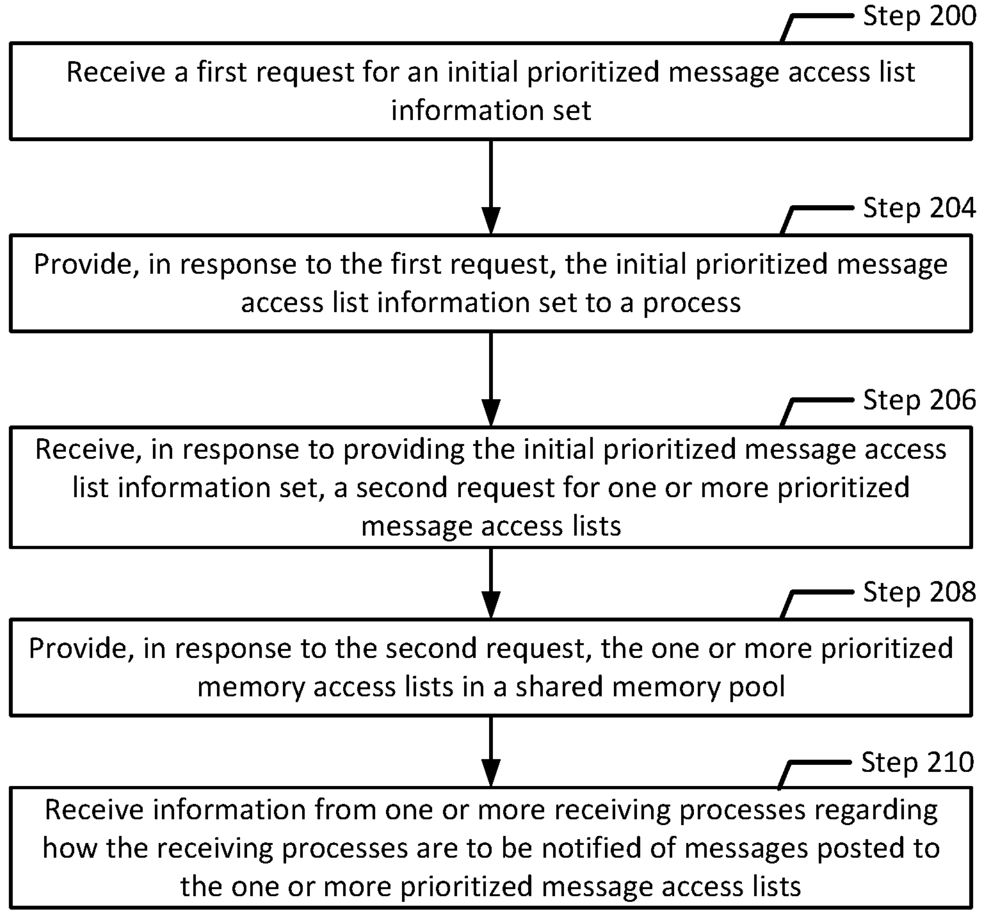
FIG. 2 illustrates an overview of an example process for configuring prioritized message access lists in a shared memory pool by an IPC manager for various processes, in accordance with one or more embodiments of this disclosure.

FIG. 2 illustrates an overview of an example process for configuring prioritized message access lists in a shared memory pool (e.g., the shared memory pool 124 shown in FIG. 1) by an IPC manager (e.g., the IPC manager 126 shown in FIG. 1) for various processes (e.g., the processes 112, 114, 116, 118, 120, and 120 shown in FIG. 1), in accordance with one or more embodiments of this disclosure.

Figure 3:
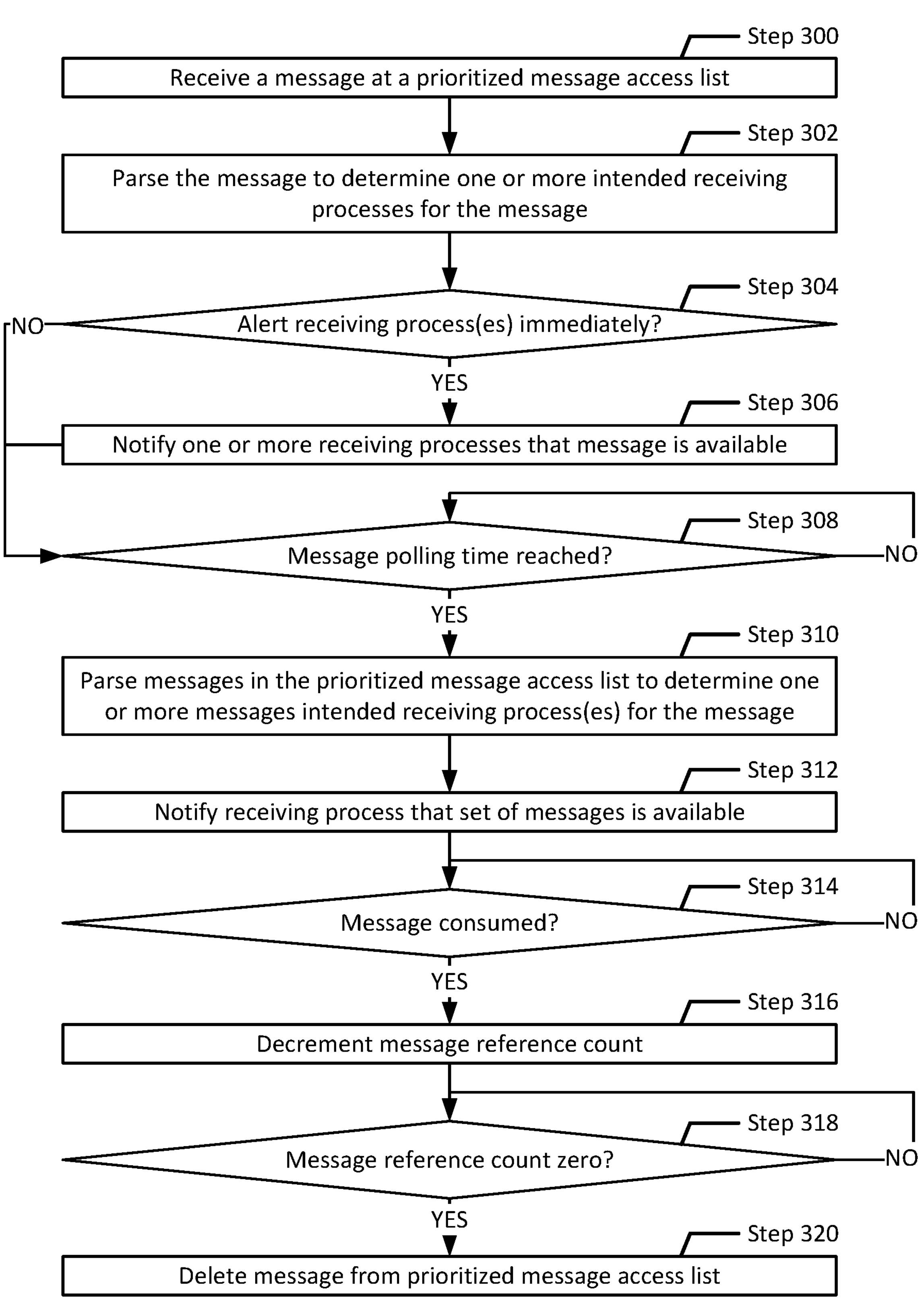
FIG. 3 illustrates an overview of a process for using prioritized message access lists to provide messages from a transmitting process to one or more receiving processes, in accordance with one or more embodiments of this disclosure.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2 and/or FIG. 3.

In Step 200, the method includes receiving a first request for an initial prioritized message access list information set. In one or more embodiments, the first request is received by an IPC manager (e.g., the IPC manager 126 shown in FIG. 1). In one or more embodiments, the first request is received from a process (e.g., a transmitting process, a receiving process, any of the processes 112, 114, 116, 118, 120, 122 shown in FIG. 1, etc.) executing on a computing device (e.g., any of the computing devices 100, 102, 104, 106, 108, 110 shown in FIG. 1) operatively connected to a shared memory pool (e.g., the shared memory pool 124 shown in FIG. 1).

In one or more embodiments, an IPC manager may pre-configure some or all prioritized message access lists that are to be used in the shared memory pool. In such embodiments, for example, the IPC manager may pre-configure any number of prioritized message access lists. Each prioritized message access list may be a list of any size (e.g., may be configured to store a minimum and/or maximum number of messages). Each prioritized message access list may be assigned a prioritized message access list identifier (e.g., a unique identifier within the shared memory pool). Each prioritized message access list may be assigned an intra-list priority range. For example, a given prioritized message access list may be assigned any number of possible priority designations within a priority range for messages within a prioritized message access list (e.g., three priority designations 0-2, fifty priority designations 0-49, one thousand priority designations 0-999, etc.). in some cases, zero may be considered the highest priority. In some cases, the largest number on the range may be considered the highest priority. Any organization scheme of priority designations in the intra list priority range to indicate relatively higher or lower priority for a message compared to other messages in a prioritized message access list may be used without departing from the scope of embodiments discussed herein. In one or more embodiments, the first request may be a request by a process to receive all or any portion of the aforementioned characteristics and/or attributes of pre-configured prioritized message access lists of the shared memory pool.

In one or more embodiments, at least some prioritized message access lists may be configured upon request, instead of pre-configured. In such embodiments, the first request for an initial prioritized message access list information set may include requesting the possible sizes for prioritized message access lists, the possible intra-list priority ranges for prioritized message access lists, the number of prioritized message access lists that may be created, etc.

In Step 204, the method includes providing, by the IPC manager and in response to the first request, the initial prioritized message access list information set to the requesting process. In cases where at least some prioritized message access lists are pre-configured, the IPC manager may provide to the requesting process details including, but not limited to, a set of prioritized message access list identifiers, sizes of the prioritized message access lists, intra-list priority ranges for the prioritized message access lists, and/or any other relevant information related to prioritized message access lists. In cases where at least some prioritized message access lists may be created upon request, the IPC manager may provide to the requesting process details including possible prioritized message access list identifiers, possible sizes of prioritized message access lists, possible intra-list priority ranges for prioritized message access lists, and/or any other relevant information related to prioritized message access lists.

In Step 206, the method includes receiving, at the IPC manager and in response to providing the initial prioritized message access list information set, a second request for one or more prioritized message access lists. In one or more embodiments, once a process has received the initial Once a process has received such information from the IPC manager, the process may request any number of prioritized message access lists to be reserved or created by the IPC manager for the process. Information set from the IPC manager, the process may request any number of prioritized message access lists to be reserved or created by the IPC manager for the process. The second request may specify, for example, the number of prioritized message access lists needed, the sizes of the prioritized message access lists being requested, relative priorities to be established between the prioritized message access lists, intra-list priority ranges to be used within the prioritized message access lists, a set of prioritized message access list identifiers for the lists, an/or any other relevant information related to prioritized message access lists that the process seeks to have configured or reserved for the process by the IPC manager.

In Step 208, the method includes providing, by the IPC manager, one or more prioritized message access lists requested in the second request. In one or more embodiments, providing the prioritized message access lists may include establishing, initializing, configuring, provisioning, etc. the prioritized message access lists within the shared memory pool, and providing information related to the prioritized message access lists to the requesting process.

In one or more embodiments, once a set of one or more prioritized message access lists have been created for a process, a transmitting process may begin using the prioritized message access list(s) to transmit inter-process communication messages to one or more receiving processes. During this time, the process that requested the one or more prioritized message access lists may communicate the prioritized message access list identifiers, and other related information, to other processes (e.g., receiving processes) that will be using the prioritized message access lists.

In Step 210, the method includes receiving, by the IPC manager, information from one or more receiving processes regarding how the receiving processes are to be notified of messages posted to the one or more prioritized message access lists. In one or more embodiments, processes that are to be receiving processes using the prioritized message access lists may communicate with the IPC manager to set up how the receiving processes will be made aware that a message has been received for the receiving processes.

As an example, a receiving process may request that the IPC manager set up a signal handler to be invoked any time a message for the receiving process is posted to a certain prioritized message access list and/or has a certain intra-list priority within a priority message access list. In such an example, the IPC manager will parse messages posted by a transmitting process, and when a message having the characteristics associated with the signal handler is identified, the IPC manager will alert the receiving process (e.g., via an interrupt) that the message is available for consumption.

As another example, a receiving process may communicate with the IPC manager that the receiving process would like the IPC manager to periodically poll messages within one or more prioritized message access lists to determine if any messages have been received for the receiving process. In such an example, at the defined polling time, the IPC manager will determine all one or more messages received for the receiving process in the prioritized message access list since the last polling period, and communicate to the receiving process the messages that are available for the receiving process to consume.

FIG. 3 illustrates an overview of a process for using prioritized message access lists to provide messages from a transmitting process to one or more receiving processes, in accordance with one or more embodiments of this disclosure. In one or more embodiments, the process is implemented, at least in part, by an IPC manager (e.g., the IPC manager 126 shown in FIG. 1) using a shared memory pool (e.g., the shared memory pool 124 shown in FIG. 1).

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2 and/or FIG. 3.

In Step 300, the method includes receiving a message at a prioritized message access list. The message may include, but is not limited to, a prioritized message access list identifier that identifies the prioritized message access list to which the message is to be posted. The message may include an intra-list priority designation within the intra-list priority range associated with the prioritized message access list. The message may include a transmitting process identifier that identifies the transmitting process that is posting the message to the prioritized message access list. The message may include one or more receiving process identifiers that identity one or more receiving processes for which the message is intended. The message may include a message reference count that specifies the number of receiving processes intended to receive the message, which may correspond to the number of receiving process identifiers. Alternatively, the number of receiving process identifiers may be used to determine the message reference count. The message may include a message payload that includes data that is being communicated from the transmitting process to one or more receiving processes. In one or more embodiments, the message is received, at least in part, by the IPC manager, which may orchestrate posting the message to the prioritized message access list. Other techniques for posting the message to the prioritized message access list may be used without departing from the scope of embodiments described herein (e.g., direct memory access techniques, network data unit receiving techniques, etc.).

In Step 302, the method includes parsing, by the IPC manager, the message to determine one or more intended receiving processes for the message. In one or more embodiments, parsing the message includes determining whether the one or more receiving process identifiers identify a receiving process for which the IPC manager has been requested to immediately notify the receiving process that the message is available.

In Step 304, the method includes determining, based on the parsing performed in Step 302, whether any receiving processes identified by the receiving process identifiers included in the message are to be immediately alerted that the message is available. As discussed above, at least some receiving processes, after being made aware that one or more prioritized message access lists have been configured in which messages for the receiving process may be posted may communicate to the IPC manager that, in the event that a message having certain characteristics and/or attributes is received, the receiving process is to be notified. As an example, a receiving process may communicate to the IPC manager that a message received in a particular prioritized message access list that has a certain intra-list priority designation, or is within a sub-range of the intra-list priority range for the prioritized message access list, should be communicated to the receiving process immediately. In one or more embodiments, if the IPC manager determines that any receiving process identifier in the message is associated with a receiving process that has requested immediate notification, and that the message also characteristics (e.g., prioritized message access list identifier, intra-list priority designation) corresponding to the request for immediate notification, the method proceeds to Step 306. In one or more embodiments, if no receiving process identifiers in the message are associated with a receiving process that has requested immediate notification, the method proceeds to Step 308.

In Step 306, the method includes notifying one or more receiving processes that the message is available. The one or more receiving process may be notified, for example, by the IPC manager that the message is available for consumption. As an example, a signal handler may be established that may be used to notify the one or more receiving processes that the message is available. The signal handler may, for example, provide an interrupt to the receiving process to alert the receiving process to obtain the message. Other techniques for notifying the one or more receiving processes that the message is available may be used without departing from the scope of embodiments described herein.

In Step 308, the method includes determining, by the IPC manager, whether a message polling time is reached. As discussed above, any number of receiving processes may communicate with the IPC manager to establish that the availability of messages intended for a receiving process that have certain characteristics and/or attributes (e.g., messages in a certain prioritized message access list having a certain identifier, messages within a prioritized message access list having an intra-list priority designation below a certain threshold, etc.) should be communicated to the receiving process periodically. As an example, a given receiving process may communicate to the IPC manager that messages having certain characteristics and/or attributes should be communicated to the receiving process after every one minute passes. Thus, the IPC manager may be triggered to determine whether any number of polling times configured for any number of receiving processes has been reached. In one or more embodiments, if a message polling time has been reached, the method proceeds to Step 310. In one or more embodiments, if no message polling time has been reached, the IPC manager may continue to check to determine when such a polling time is reached.

In Step 310, the method includes parsing the messages in at least one prioritized message access list to determine one or more messages intended for one or more receiving processes. In one or more embodiments, the IPC manager parses the messages in a prioritized message access list to determine any messages therein that include a receiving process identifier associated with the receiving process for which the message polling time is configured. In one or more embodiments, the IPC manager determines all messages in a prioritized message access list intended for a receiving process that have been received since the last polling time configured for the receiving process In Step 312, the method includes notifying a receiving process that one or more messages are available for the receiving process to consume. In one or more embodiments, the receiving process is notified of the availability of the one or more messages by the IPC manager. The notification may be provided to the receiving process using any suitable technique for making a receiving process aware that one or more prioritized message access lists in the shared memory pool include messages for the receiving process.

In Step 314, the method includes determining, by the IPC manager, whether a message has been consumed by a receiving process. The IPC manager may become aware that a receiving process has consumed a message using any suitable technique (e.g., being informed by the receiving process, monitoring accesses to the memory location of the message by receiving processes, etc.).

In Step 316, the method includes decrementing, by the IPC manager, the message reference count of the message. As an example, a given message may be intended for any number of receiving processes. As receiving processes access, obtain, or otherwise consume the message, the message reference count may be decremented to indicate that one less receiving process still needs to obtain the message. Decrementing the message reference count may occur each time an intended receiving process for a message consumes the message.

In Step 318, the method includes making a determination as to whether the message reference count for a message in a prioritized message access list has reached zero. In one or more embodiments, a message reference count for a give message reaching zero indicates that all intended receiving process for which the message is intended have consumed the message.

In Step 320, the method includes deleting the message from the prioritized message access list. In one or more embodiments, deletion of the message is caused by the IPC manager. In one or more embodiments, deleting the message once all intended receiving processes have consumed the message frees space in the prioritized message access list for additional messages to be received from a transmitting process.

Figure 4:
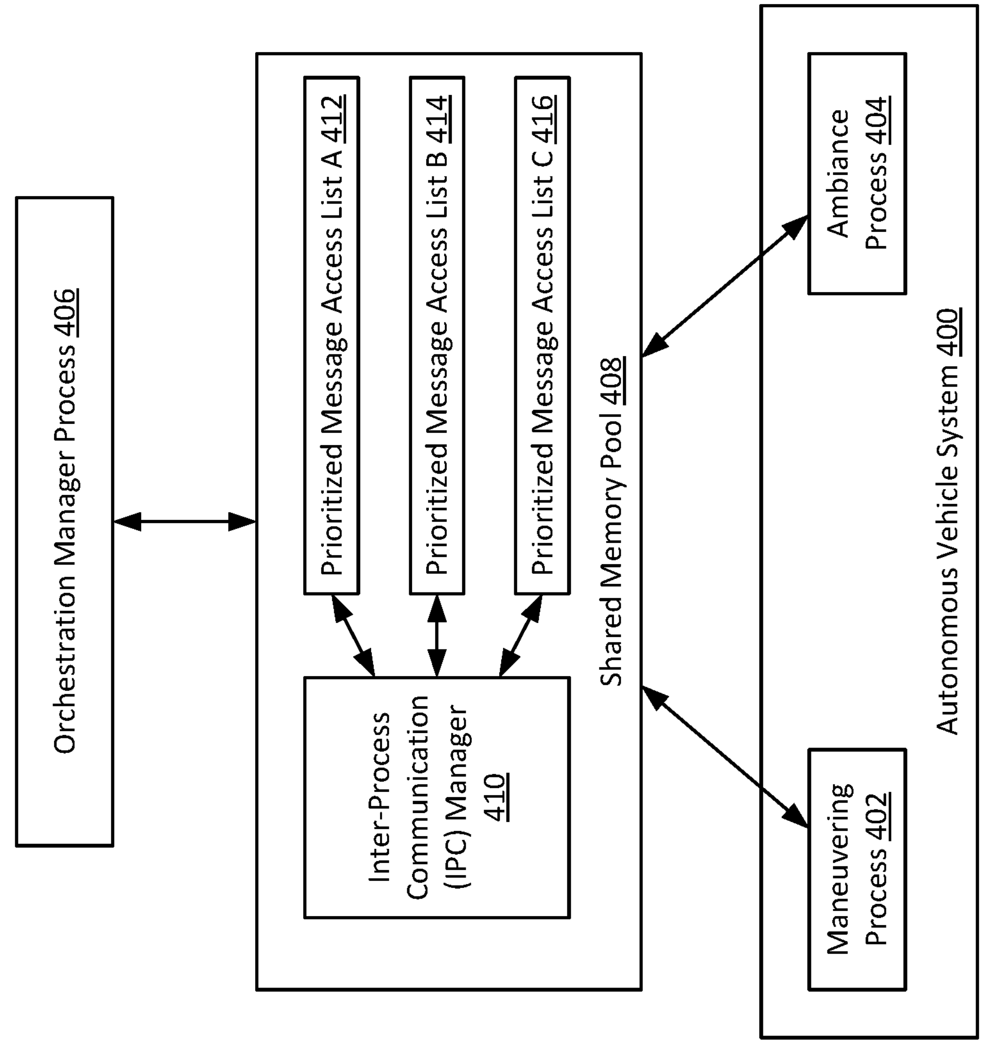
FIG. 4 illustrates an example system for inter-process communication using prioritized message access lists in a shared memory pool, in accordance with one or more embodiments of this disclosure.

FIG. 4 illustrates an example system for inter-process communication using prioritized message access lists in a shared memory pool, in accordance with one or more embodiments of this disclosure. The example shown in FIG. 4 and discussed below is a simplified example intended for explanatory purposes only, and not intended to limit the scope of embodiments described herein. Additionally, while the example shows certain aspects of embodiments described herein, all possible aspects of such embodiments may not be illustrated in this particular example.

Consider a scenario in which an autonomous vehicle includes an autonomous vehicle system 400. The autonomous vehicle system 400 may include any number of computing devices, processors, or other computing resources (not shown), which may be used for executing various processes, such as, for example, a maneuvering process 402 and an ambiance process 404. Control of the autonomous vehicle system 400 may be performed, at least in part, by an orchestration manager process 406, which may execute on a computing device and/or processor (not shown) external to and separate from the autonomous vehicle system 400. In order to communicate, the maneuvering process 402, the ambiance process 404, and the orchestration manager process 406 may be operatively connected to a shared memory pool 408.

In such a scenario, the shared memory pool may include and/or be operatively connected to an IPC manager 410. The orchestration manager process 406 is a transmitting process, and the maneuvering process 402 and the ambiance process 404 are receiving processes. The orchestration manager process 406 may communicate with the receiving processes to control, at least in part, the autonomous vehicle system 400, with such communication occurring via prioritized message access lists implemented by the IPC manager 410 in the shared memory pool 408.

The orchestration manager process 406 may send a first request to the IPC manager 410 seeking an initial prioritized message access list information set. The IPC manager 410 may be configured to provide prioritized message access lists upon request. Therefore, the IPC manager 410 may respond to the first request by providing to the orchestration manager process 406 an initial prioritized message access list information set that includes information such as: up to 10,000 prioritized message access lists may be configured, that each list may include up to 1000 messages, and that a given list may have an intra-list priority range of up to 1000 intra-list priority designations 0-999. In response to receiving the initial prioritized message access list information set, the orchestration manager process 406 may send to the IPC manager 410 a second request. The second request may indicate that the orchestration manager process 406 would like three prioritized message access lists to be provided. Of the prioritized message access lists being requested, the orchestration manager process may request that one be a highest priority among the lists, a second be a medium priority among the lists, and a third be a lowest priority among the lists. For the highest priority first prioritized message access list, the orchestration manager process 406 requests a size of 100 messages, and an intra-list priority range of 0-49. For the medium priority second prioritized message access list, the orchestration manager process 406 requests that a size of 20 messages, and an intra-list priority range of 0-19. For the lowest priority third prioritized message access list, the orchestration manager process 406 requests that a size of 3 messages, and an intra-list priority range of 0-2.

In response to receiving the second request, the IPC manager 410 configures the requested prioritized message access lists in the shared memory pool 408 as prioritized message access list A 412, prioritized message access list B 414, and prioritized message access list C 416. Prioritized message access list A 412 is given a prioritized message access list identifier A, configured as requested, and is the highest priority among the lists. Prioritized message access list B is given a prioritized message access list identifier B, configured as requested, and is of medium priority among the lists. Prioritized message access list C is given a prioritized message access list identifier C, configured as requested, and is the lowest priority among the lists.

The IPC manager 410 then provides relevant information about the three prioritized message access lists to the orchestration manager process 406. The orchestration manager process 406 then communicates to the maneuvering process 402 the prioritized message access list identifiers of prioritized message access list A 412 and prioritized message access list B 414, which will be used to send messages to the maneuvering process 402, along with the intra-list priority range for the lists. The orchestration manager process 406 also communicates the prioritized message access list identifier for the prioritized message access list C 416 to the ambiance process 404 the prioritized message access list identifier and intra-list priority range for the prioritized message access list C 416, which will be used to send messages to the ambiance process 404.

The maneuvering process 402, in response to receiving the information regarding the prioritized message access list A 412 and the prioritized message access list B 414 from the orchestration manager process 406, communicates with the IPC manager to set up when the maneuvering process 402 will be notified of messages received in the lists intended for the maneuvering process 402. Specifically, the maneuvering process 402 requests that the IPC manager set up a signal handler to trigger immediate notification of any message received in the prioritized message access list A 412 for the maneuvering process that has an inter-process priority designation between 0 and 9, a 10 second polling period for any message received in the prioritized message access list A 412 between 10 and 49, and a 30 second polling period for any message received for the maneuvering process 402 in the prioritized message access list B 414.

The ambiance process 404, in response to receiving the information regarding the prioritized message access list C 416 from the orchestration manager process 406, communicates with the IPC manager to set up when the ambiance process 404 will be notified of messages received for the ambiance process 404 in the prioritized message access list C 416. Specifically, the ambiance process 404 requests that the IPC manager set up a signal handler to trigger immediate notification of the ambiance process for any message intended for the ambiance process 404 posted in the prioritized message access list C 416 that includes an intra-list message priority of 0, and a 20 second polling period for any message posted to the prioritized message access list C 416 with an intra-list priority of 1 or 2.

Once the aforementioned set up of the prioritized message access lists is complete, the orchestration manager process 406 may begin posting messages for the maneuvering process 402 and the ambiance process 404 in the shared memory pool 408 using the prioritized message access list A 412, the prioritized message access list B 414, and the prioritized message access list C 416.

At a first time, the orchestration manager process may become aware that the autonomous vehicle system 400 is approaching a stretch of road that has a speed limit that is higher than the current speed of the autonomous vehicle system, and thus may post a first message to the prioritized message access list B 414 that the maneuvering process should increase speed to the upcoming speed limit. The first message may include an identifier of the orchestration manager process 406 as the transmitting process identifier, a receiving process identifier corresponding to the maneuvering process 402, and an intra-list priority of 0, to indicate that the message should be consumed before other messages with a lower priority from the prioritized message access list B 414.

The IPC manager parses the message to determine that it is posted to the prioritized message access list B 414, and that it is intended for the maneuvering process 402, for which a 30 second polling period is configured. As such, the IPC manager does not yet notify the maneuvering process of the message.

As the 30 second polling period is reached, the orchestration manager process 406 becomes aware that a partial obstruction has entered the roadway on which the autonomous vehicle system 400 is traversing. In response, the orchestration manager process 406 posts a second message to the prioritized message access list A 412 that identifies the orchestration manager process as the transmitting process, the maneuver process 402 as the receiving process, an intra-list priority of 0, and a command to stop any acceleration. The orchestration manager process 406 also posts a third message A 412 to the prioritized message access list A 412 with the same transmitting and receiving process identifiers, an intra-list priority of 3, and a message payload indicating that the maneuvering process 402 should apply the brakes for a certain amount of time. The orchestration manager process 406 also posts a fourth message to the prioritized message access list A 412 with the same transmitting and receiving process identifiers, an intra-list priority of 7, and a message payload indicating that the autonomous vehicle system should steer to in a certain direction a certain amount.

The three messages posted to the prioritized message access list A 412 all include intra-list priority designations between 0 and 9, and thus the IPC manager invokes a signal handler to immediately notify the maneuvering process 402 that the second message, the third message, and the fourth message are available. At approximately the same time, the 30 second polling period corresponding to the prioritized message access list B is reached, and so the IPC manager also notifies the maneuvering process 402 of the first message.

Based on the configuration of the prioritized message access lists, the maneuvering process consumes the second message first, as it is in the highest priority list and includes the highest intra-list priority, the third message second, as it is in the highest priority list and has the second highest intra-list priority, the fourth message third, as it is in the highest priority list and includes the third highest intra-list priority, and the first message fourth, as it is in the medium priority list. Therefore, the maneuvering process 402 stops accelerating, applies the brakes, and performs steering, in that order, before acting on the fourth message to increase speed in response to the upcoming speed limit.

In parallel, the orchestration manager process 406 posts a message to the prioritized message access list C 416 that includes an identifier of the orchestration manager process as the transmitting process identifier, an identifier of the ambiance process as the receiving process identifier, an intra-list priority of 0, and a message payload that includes an instruction for an entertainment system controlled by the ambiance process to provide a warning to occupants of the autonomous vehicle system 400 of the upcoming partial obstruction. The IPC manager parses the message to determine that the message is in the prioritized message access list C 416 and includes an intra-list priority of 0, and thus invokes a signal handler to notify the ambiance process 404 immediately of the message. In response, the ambiance process consumes the message, and provides the warning.

In the above simple example, the orchestration manager process 406, via the IPC manager 410 and the shared memory pool 408, was able to communicate messages to the maneuvering process 402 and the ambiance process 404 using the prioritized message access lists A-C. The maneuvering process 402 and the ambiance process 404 were able to consume the messages in a prioritized manner based on the prioritized message access list to which the messages were posted, and the intra-list priorities assigned to the messages, in order to allow the orchestration manager process 406 to correctly control the autonomous vehicle system 400.

Figure 5:
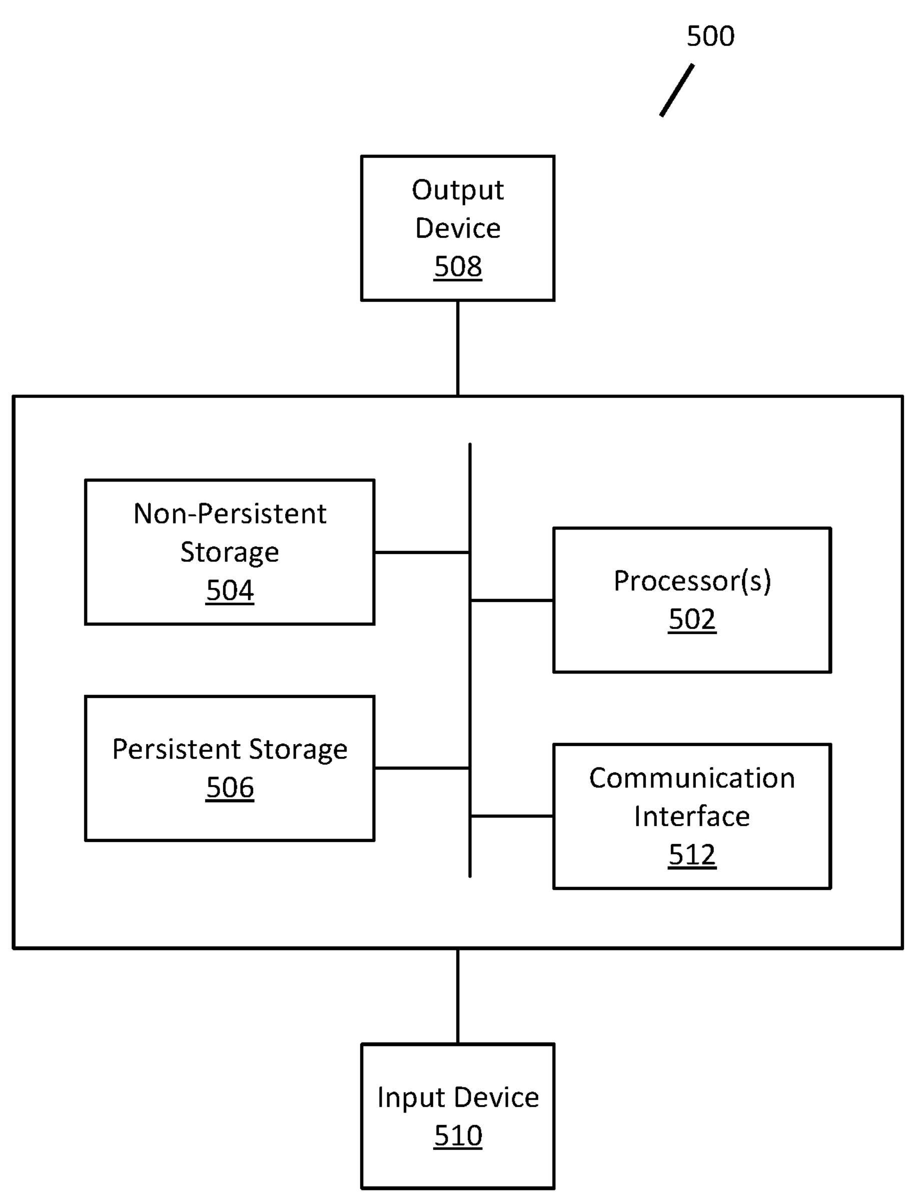
FIG. 5 illustrates a block diagram of a computing device, in accordance with one or more embodiments of this disclosure.

FIG. 5 illustrates a block diagram of a computing device, in accordance with one or more embodiments of this disclosure. As discussed above, embodiments described herein may be implemented using computing devices. For example, the all or any portion of the components shown in FIG. 1 may be implemented, at least in part, using one or more computing devices. The computing device 500 may include one or more computer processors 502, non-persistent storage 504 (e.g., volatile memory, such as random access memory (RAM), cache memory, etc.), persistent storage 506 (e.g., a hard disk, an optical drive such as a compact disk (CD) drive or digital versatile disk (DVD) drive, a flash memory, etc.), a communication interface 512 (e.g., Bluetooth interface, infrared interface, network interface, optical interface, etc.), input devices 510, output devices 508, and numerous other elements (not shown) and functionalities. Each of these components is described below.

In one or more embodiments, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. Although only one processor 502 is shown in FIG. 5, the computing device 500 may include any number of processors without departing from the scope of embodiments disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more embodiments, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multi-modal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

In the above description of the figures, any component described with regard to a figure, in various embodiments described herein, may be equivalent to one or more same or similarly named and/or numbered components described with regard to any other figure. For brevity, descriptions of these components may not be repeated with regard to each figure. Thus, each and every embodiment of the components of each figure is incorporated by reference and assumed to be optionally present within every other figure having one or more same or similarly named and/or numbered components. Additionally, in accordance with various embodiments described herein, any description of the components of a figure is to be interpreted as an optional embodiment, which may be implemented in addition to, in conjunction with, or in place of the embodiments described with regard to a corresponding one or more same or similarly named and/or numbered component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. An apparatus, comprising:

one or more processors; and one or more non-transitory computer readable media storing instruction which, when executed by the one or more processors, cause the one or more processors to:

provide, by an inter-process communication (IPC) manager and in response to a first request, an initial prioritized message access list information set;

receive, by the IPC manager and in response to providing the initial prioritized message access list information set, a second request for at least one prioritized message access list;

provide, by the IPC manager in response to the second request, a prioritized message access list within a shared memory pool, the prioritized message access list comprising a prioritized message access list identifier, an intra-list priority range, and a prioritized message access list size;

parse, by the IPC manager a message posted to the prioritized message access list to determine a time at which to alert a receiving process about the message, wherein:

the message comprises the prioritized message access list identifier, a transmitting process identifier, one or more receiving process identifiers, an intra-list priority within the intra-list priority range, and a message reference count, a receiving process identifier of the one or more receiving process identifiers is associated with the receiving process, and the time is determined based at least in part on the prioritized message access list identifier and the intra-list priority;

notify the receiving process at the determined time; and decrement, in response to the receiving process consuming the message, the message reference count.

2. The apparatus of claim 1, wherein the initial prioritized message access list information set corresponds to pre-configured prioritized message access lists.

3. The apparatus of claim 1, wherein the initial prioritized message access list information set comprises a minimum configurable list size, a maximum configurable list size, and configurable intra-list priority range information.

4. The apparatus of claim 1, wherein providing the prioritized message access list comprises reserving a pre-configured prioritized message access list.

5. The apparatus of claim 1, wherein providing the prioritized message access list comprises configuring the prioritized message access list based on the second request.

6. The apparatus of claim 1, wherein the prioritized message access list identifier is associated with a relative priority for the prioritized message access list among a plurality of prioritized message access lists of the shared memory pool.

7. The apparatus of claim 1, wherein the intra-list priority range includes a plurality of priority designations for establishing relative priorities of a plurality of messages in the prioritized message access list.

8. The apparatus of claim 1, wherein the instructions further cause the one or more processors to:

determine, by the IPC manager, that the message reference count is zero; and delete the message based on the message reference count being zero.

9. A method, comprising:

providing, by an inter-process communication (IPC) manager and in response to a first request, an initial prioritized message access list information set;

receiving, by the IPC manager and in response to providing the initial prioritized message access list information set, a second request for at least one prioritized message access list;

providing, by the IPC manager in response to the second request, a prioritized message access list within a shared memory pool, the prioritized message access list comprising a prioritized message access list identifier, an intra-list priority range, and a prioritized message access list size;

parsing, by the IPC manager a message posted to the prioritized message access list to determine a time at which to alert a receiving process about the message, wherein:

the message comprises the prioritized message access list identifier, a transmitting process identifier, one or more receiving process identifiers, an intra-list priority within the intra-list priority range, and a message reference count, a receiving process identifier of the one or more receiving process identifiers is associated with the receiving process, and the time is determined based at least in part on the prioritized message access list identifier and the intra-list priority;

notifying the receiving process at the determined time; and decrementing, in response to the receiving process consuming the message, the message reference count.

10. The method of claim 9, wherein the initial prioritized message access list information set corresponds to pre-configured prioritized message access lists.

11. The method of claim 9, wherein the initial prioritized message access list information set comprises a minimum configurable list size, a maximum configurable list size, and configurable intra-list priority range information.

12. The method of claim 9, wherein providing the prioritized message access list comprises reserving a pre-configured prioritized message access list.

13. The method of claim 9, wherein providing the prioritized message access list comprises configuring the prioritized message access list based on the second request.

14. The method of claim 9, wherein the prioritized message access list identifier is associated with a relative priority for the prioritized message access list among a plurality of prioritized message access lists of the shared memory pool.

15. The method of claim 9, wherein the intra-list priority range includes a plurality of priority designations for establishing relative priorities of a plurality of messages in the prioritized message access list.

16. The method of claim 9, further comprising:

determining, by the IPC manager, that the message reference count is zero; and deleting the message based on the message reference count being zero.

17. A non-transitory computer-readable medium storing programming for execution by one or more processors, the programming comprising instructions to:

provide, by an inter-process communication (IPC) manager and in response to a first request, an initial prioritized message access list information set;

receive, by the IPC manager and in response to providing the initial prioritized message access list information set, a second request for at least one prioritized message access list;

provide, by the IPC manager in response to the second request, a prioritized message access list within a shared memory pool, the prioritized message access list comprising a prioritized message access list identifier, an intra-list priority range, and a prioritized message access list size;

parse, by the IPC manager a message posted to the prioritized message access list to determine a time at which to alert a receiving process about the message, wherein:

the message comprises the prioritized message access list identifier, a transmitting process identifier, one or more receiving process identifiers, an intra-list priority within the intra-list priority range, and a message reference count, a receiving process identifier of the one or more receiving process identifiers is associated with the receiving process, and the time is determined based at least in part on the prioritized message access list identifier and the intra-list priority;

notify the receiving process at the determined time; and decrement, in response to the receiving process consuming the message, the message reference count.

18. The non-transitory computer-readable medium of claim 17, wherein providing the prioritized message access list comprises configuring the prioritized message access list based on the second request.

19. The non-transitory computer-readable medium of claim 17, wherein the prioritized message access list identifier is associated with a relative priority for the prioritized message access list among a plurality of prioritized message access lists of the shared memory pool.

20. The non-transitory computer-readable medium of claim 17, wherein the intra-list priority range includes a plurality of priority designations for establishing relative priorities of a plurality of messages in the prioritized message access list.

* * * * *